US012671965B2

(12) United States Patent
Ko

(10) Patent No.: US 12,671,965 B2
(45) Date of Patent: Jun. 30, 2026

(54) TELEMATICS TERMINAL AND METHOD OF CHANGING COMMUNICATION SETTING OF TELEMATICS TERMINAL

(71) Applicants: Hyundai Motor Company, Seoul (KR); Kia Corporation, Seoul (KR)

(72) Inventor: Jaeyoon Ko, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 831 days.

(21) Appl. No.: 18/063,439

(22) Filed: Dec. 8, 2022

(65) Prior Publication Data

US 2023/0300575 A1 Sep. 21, 2023

(30) Foreign Application Priority Data

Mar. 18, 2022 (KR) ......................... 10-2022-0033889

(51) Int. Cl.
*H04W 8/24* (2009.01)
*H04W 4/14* (2009.01)
*H04W 8/26* (2009.01)
*H04W 80/08* (2009.01)

(52) U.S. Cl.
CPC .............. *H04W 4/14* (2013.01); *H04W 8/26* (2013.01)

(58) Field of Classification Search
CPC ......... H04W 4/14; H04W 8/26; H04W 8/245; H04W 48/18; H04W 80/085; H04W 88/06; H04W 4/44; H04W 4/50; H04L 51/06; H04L 69/08
See application file for complete search history.

(56) References Cited

U.S. PATENT DOCUMENTS

| | | | | |
|---|---|---|---|---|
| 9,736,619 | B2 * | 8/2017 | Kim | ...................... H04W 68/12 |
| 2004/0204117 | A1 | 10/2004 | Weiner | |
| 2011/0105157 | A1 * | 5/2011 | Nguyen | ................... H04Q 9/00 |
| | | | | 455/466 |
| 2012/0208537 | A1 | 8/2012 | Edge et al. | |

(Continued)

FOREIGN PATENT DOCUMENTS

| | | |
|---|---|---|
| JP | 2021119683 A | 8/2021 |
| KR | 20130007254 A | 1/2013 |

*Primary Examiner* — Joseph E Dean, Jr.
(74) *Attorney, Agent, or Firm* — Slater Matsil, LLP

(57) ABSTRACT

An embodiment is a method of changing communication settings of a telematics terminal, the method including performing, by the telematics terminal, short message service (SMS) communication with a server based on a first SMS number corresponding to a first communication standard, updating, by the telematics terminal, software based on update data for changing a communication standard applied to the SMS communication, transmitting, by the telematics terminal, information on the communication standard applied to the SMS communication to the server, transmitting, by the server, a second SMS number corresponding to a second communication standard to the telematics terminal based on the information on the communication standard applied to the SMS communication, and updating, by the telematics terminal, the first SMS number to the second SMS number based on reception of the second SMS number from the server and performing the SMS communication with the server based on the second SMS number.

20 Claims, 8 Drawing Sheets

(56) References Cited

U.S. PATENT DOCUMENTS

| | | |
|---|---|---|
| 2013/0171989 A1 | 7/2013 | Rahman et al. |
| 2017/0006471 A1 | 1/2017 | Kim et al. |
| 2018/0302850 A1 | 10/2018 | Osterwise et al. |
| 2019/0380023 A1 | 12/2019 | Kamibeppu |
| 2020/0396592 A1 | 12/2020 | Okita et al. |

* cited by examiner

FIG. 6

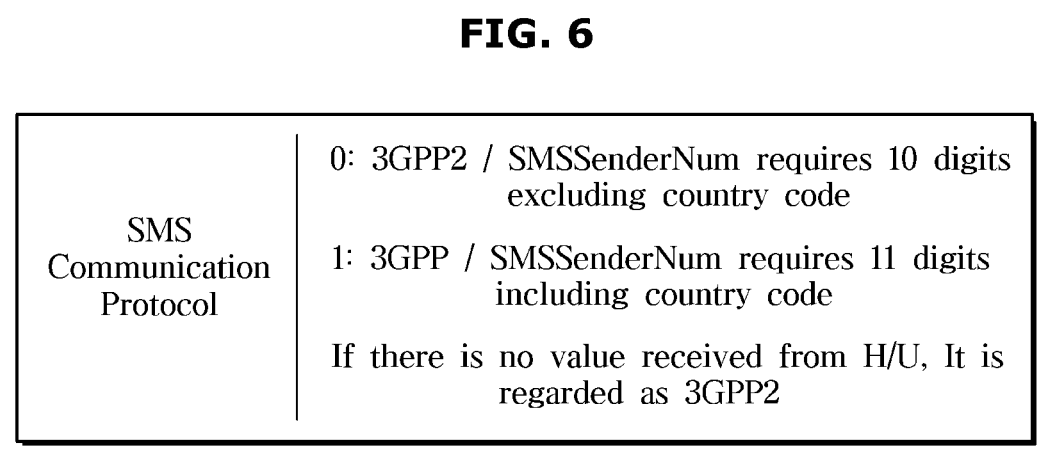

| SMS Communication Protocol | 0: 3GPP2 / SMSSenderNum requires 10 digits excluding country code<br><br>1: 3GPP / SMSSenderNum requires 11 digits including country code<br><br>If there is no value received from H/U, It is regarded as 3GPP2 |
|---|---|

FIG. 7

| Provisioning Update | Whether to update TMU provisioning<br><br>0: Not executed<br><br>1: Update required |
| --- | --- |

FIG. 8

| SMS COMMUNICATION STANDARD | SMS NUMBER |
|---|---|
| 3GPP2 | 10 Digit |
| 3GPP | 11 Digit (Including country code) |

TELEMATICS TERMINAL AND METHOD OF CHANGING COMMUNICATION SETTING OF TELEMATICS TERMINAL

CROSS-REFERENCE TO RELATED APPLICATIONS

This application is based on and claims priority under 35 U.S.C. § 119 to Korean Patent Application No. 10-2022-0033889, filed on Mar. 18, 2022, in the Korean Intellectual Property Office, which application is incorporated by reference herein in its entirety.

TECHNICAL FIELD

The disclosure relates to a telematics terminal and a method of changing a communication setting of the telematics terminal.

BACKGROUND

Recently, with the development of vehicle IT technology, the number of vehicles equipped with a telematics terminal is increasing.

Telematics, a term combining telecommunication and informatics, is defined as a next-generation information provision service for vehicles through the combination of the IT industry and the automobile industry.

A vehicle telematics service may provide a driver with an accident or theft detection of a vehicle, driving route guidance, traffic and living information, remote vehicle diagnostic services, financial services, games, etc., in real time by combining mobile communication technology and global positioning system (GPS) with a vehicle.

The telematics terminal may perform Internet communication through a server providing a telematics service and a wireless communication network, and transmit and receive various data by performing SMS communication through a short message service (SMS) number.

However, when a mobile communication company demolishes a base station to which an existing communication standard is applied and builds a base station to which a new communication standard is applied, the telematics terminal becomes unable to communicate with the server.

SUMMARY

It is an aspect of the disclosure to provide a telematics terminal capable of communicating with a server through a base station to which a new communication standard is applied only by updating software without replacing hardware, and a method of changing a communication setting of the telematics terminal.

Additional aspects of the disclosure will be set forth in part in the description which follows and, in part, will be obvious from the description, or may be learned by practice of the disclosure.

In accordance with an aspect of the disclosure, in a method of changing a communication setting of a telematics terminal provided in a vehicle, the method includes performing, by the telematics terminal, SMS communication with a server based on a first short message service (SMS) number corresponding to a first communication standard, updating, by the telematics terminal, software based on update data for changing a communication standard applied to the SMS communication, transmitting, by the telematics terminal, information on the communication standard applied to the SMS communication to the server, transmitting, by the server, a second SMS number corresponding to a second communication standard to the telematics terminal based on the information on the communication standard applied to the SMS communication, and updating, by the telematics terminal, the first SMS number to the second SMS number based on reception of the second SMS number from the server and performing the SMS communication with the server based on the second SMS number.

The transmitting of the second SMS number to the telematics terminal may include transmitting, by the server, a first signal for notifying that the SMS number needs to be updated to the telematics terminal based on the communication standard applied to the SMS communication corresponding to the second communication standard, transmitting, by the telematics terminal, a second signal for requesting the second SMS number to the server based on reception of the first signal, and transmitting, by the server, the second SMS number to the telematics terminal based on reception of the second signal.

The updating of the first SMS number to the second SMS number may include transmitting, by the telematics terminal, a first signal for notifying that the update has been completed to the server through the second SMS number, transmitting, by the server, a second signal for notifying that the first signal has been received to the telematics terminal through the second SMS number based on reception of the first signal, and updating, by the telematics terminal, the first SMS number to the second SMS number based on reception of the second signal.

The transmitting, by the telematics terminal, of the information on the communication standard applied to the SMS communication to the server may be performed based on ignition of the vehicle being turned on.

The method may further include performing, by the telematics terminal, the SMS communication with the server based on the second SMS number after the first SMS number is updated to the second SMS number.

The first communication standard may be a 3rd Generation Partnership Project 2 (3GPP2) standard, and the second communication standard may be a 3rd Generation Partnership Project (3GPP) standard.

The first SMS number may not include a country code, and the second SMS number may include a country code.

The first SMS number may include a 10-digit number, and the second SMS number may include an 11-digit number.

The updating, by the telematics terminal, of the software based on the update data may be performed through Internet communication based on at least one of the first communication standard and the second communication standard.

The transmitting, by the telematics terminal, of the information on the communication standard applied to the SMS communication to the server, and the transmitting, by the server, of the second SMS number to the telematics terminal may be performed through Internet communication based on the second communication standard.

In accordance with an aspect of the disclosure, in a telematics terminal provided in a vehicle, the telematics terminal includes a communication module provided to communicate with a server, a memory in which software for controlling the communication module is stored, and a processor provided to control the communication module based on the software stored in the memory, wherein when a first software is stored in the memory, the processor controls the communication module to perform SMS communication with the server based on a first SMS number corresponding to a first communication standard, and wherein when a second software to which the first software is updated is stored in the memory, the processor controls the communication module to transmit information on a communication standard applied to the SMS communication to the server and receive a second SMS number corresponding to a second communication standard from the server, updates the first SMS number to the second SMS number based on reception of the second SMS number from the server, and controls the communication module to perform the SMS communication with the server based on the second SMS number.

The processor may control the communication module to transmit a second signal for requesting the second SMS number to the server based on reception of a first signal transmitted by the server in response to the communication standard applied to the SMS communication corresponding to the second communication standard.

The processor may control the communication module to transmit a first signal for notifying that the update has been completed to the server through the second SMS number, and update the first SMS number to the second SMS number based on reception of a second signal transmitted by the server through the second SMS number in response to reception of the first signal.

The processor may control the communication module to transmit the information on the communication standard applied to the SMS communication to the server based on ignition of the vehicle being turned on.

The processor may control the communication module to perform the SMS communication with the server based on the second SMS number after the first SMS number is updated to the second SMS number.

The first communication standard may be a 3rd Generation Partnership Project 2 (3GPP2) standard, and the second communication standard may be a 3rd Generation Partnership Project (3GPP) standard.

The first SMS number may not include a country code, and the second SMS number may include a country code.

The first SMS number may include a 10-digit number, and the second SMS number may include an 11-digit number.

The communication module may receive update data for updating the first software to the second software through Internet communication based on the first communication standard or the second communication standard.

The communication module may transmit the information on the communication standard applied to the SMS communication to the server through Internet communication based on the second communication standard, and receive the second SMS number corresponding to the second communication standard from the server.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 illustrates an example of communication standard information transmitted from the telematics terminal to a server;

FIG. 7 illustrates an example of an update request message transmitted from the server to the telematics terminal; and FIG. 8 illustrates an example of the form of SMS numbers according to various communication standards.

DETAILED DESCRIPTION OF ILLUSTRATIVE EMBODIMENTS

Figure 1:
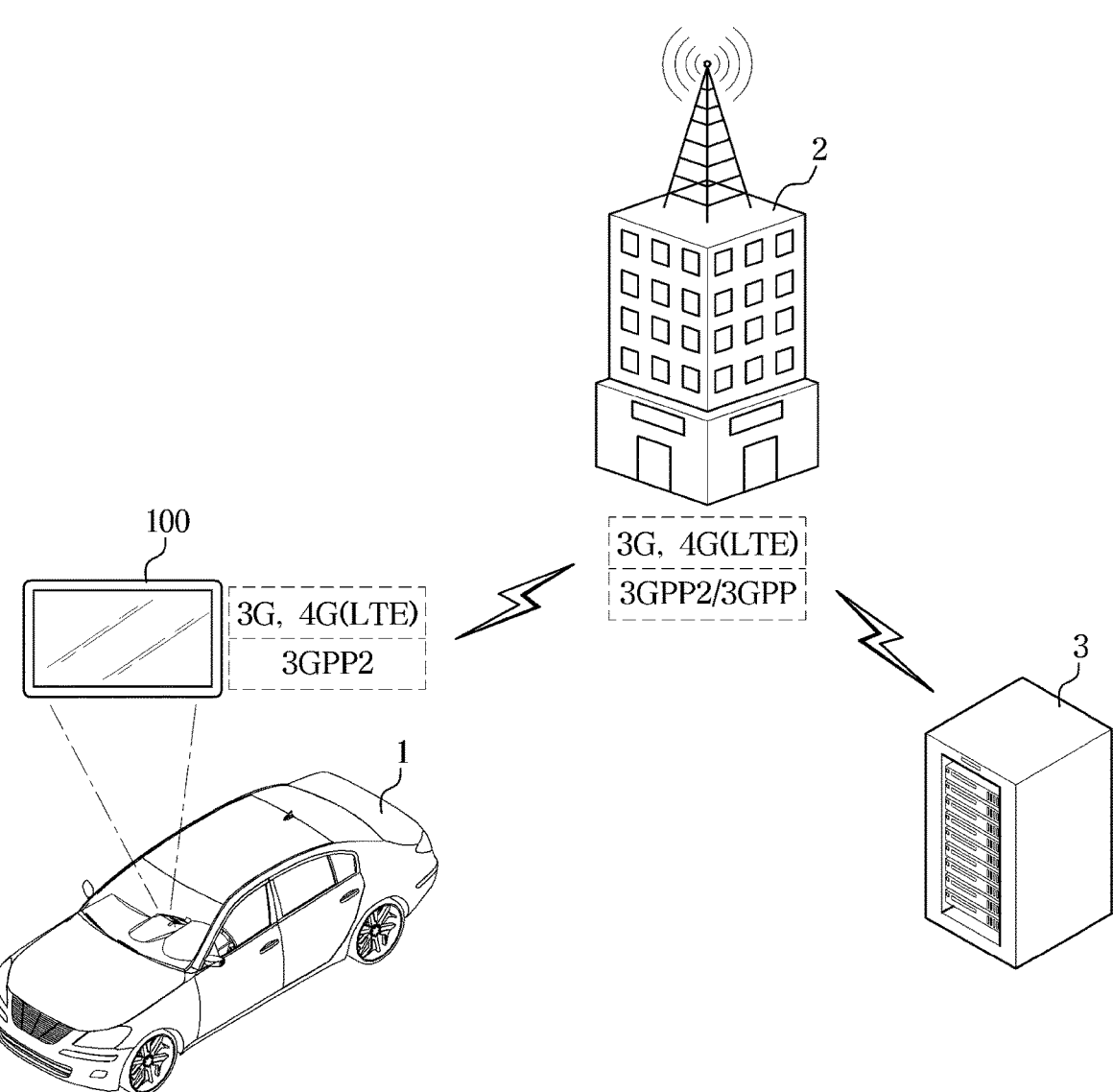
FIG. 1 illustrates a situation in which a base station supports both a first communication standard and a second communication standard.

Advantages and features of the disclosure, as well as a method and devices for achieving them, will be made clear by the embodiments described below with reference to the accompanying drawings. However, the disclosure is not limited to the embodiments disclosed below and may be implemented in various different forms, only the disclosed embodiments are provided such that the disclosure of the invention is complete, and to fully inform those of ordinary skill in the art to which the disclosure belongs, the scope of the invention, and the disclosure is only defined by the scope of the claims.

Terms used in the disclosed specification will be briefly described, and the disclosure will be described in detail.

In the disclosed specification, general terms currently widely used as possible are selected while considering the functions in the disclosure, but these terms may vary depending on the intention or precedent of a person skilled in the art, the emergence of new technology, and the like. In addition, in a specific case, there may be a term arbitrarily selected by the applicant, and in this case, the meaning will be described in detail in the corresponding description of the disclosure. Therefore, the terms used in the disclosure should be defined based on the meaning of the terms and the overall content of the disclosure, not just the names of the terms.

Throughout the specification, when it is described that a part "includes" an element, it means that the element may further include other elements, not excluding the other elements unless specifically stated otherwise. The term 'part' used in this specification may be implemented as software or hardware such as FPGA and ASIC, and the term 'part' perform certain functions. However, the 'part' is not limited to software or hardware. The 'part' may be configured to be provided on an addressable storage medium or configured to reproduce one or more processors. Thus, as an example, the 'part' includes components such as software components, object-oriented software components, class components and task components, processes, functions, properties, procedures, subroutines, segments of program code, drivers, firmware, microcode, circuits, data, databases, data structures, tables, arrays and variables. The functionality provided within the components and 'parts' may be combined into a smaller number of components and 'parts' or further divided into additional components and 'parts'.

Identification numerals assigned to steps are used to identify the steps, the identification numerals do not indicate the order of the steps, and each step may be performed differently from the specified order unless the context clearly indicates a specific order.

Hereinafter, embodiments of a telematics terminal and a method of changing a communication setting of the telematics terminal will be described in detail with reference to the accompanying drawings so that a person skilled in the art to which the disclosure belongs may easily implement the embodiments. In order to clearly explain the disclosure, parts not related to the explanation will be omitted from the drawings. In addition, in the drawings, the same reference numerals denote the same components, and overlapping descriptions thereof will be omitted.

Figure 2:
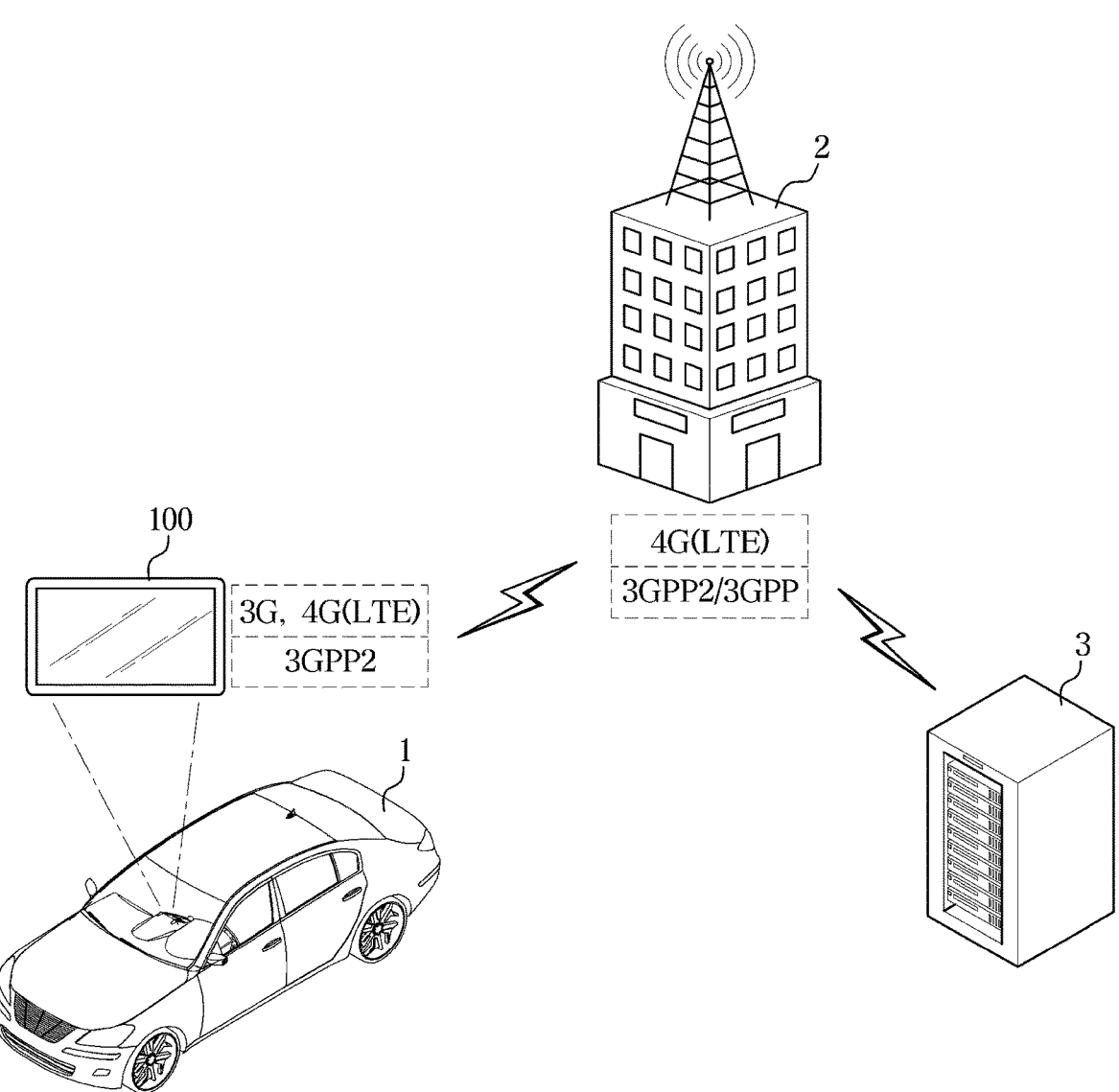
FIG. 2 illustrates a situation in which the base station supports only the second communication standard for Internet communication, but temporarily supports the first communication standard for SMS communication.
Figure 3:
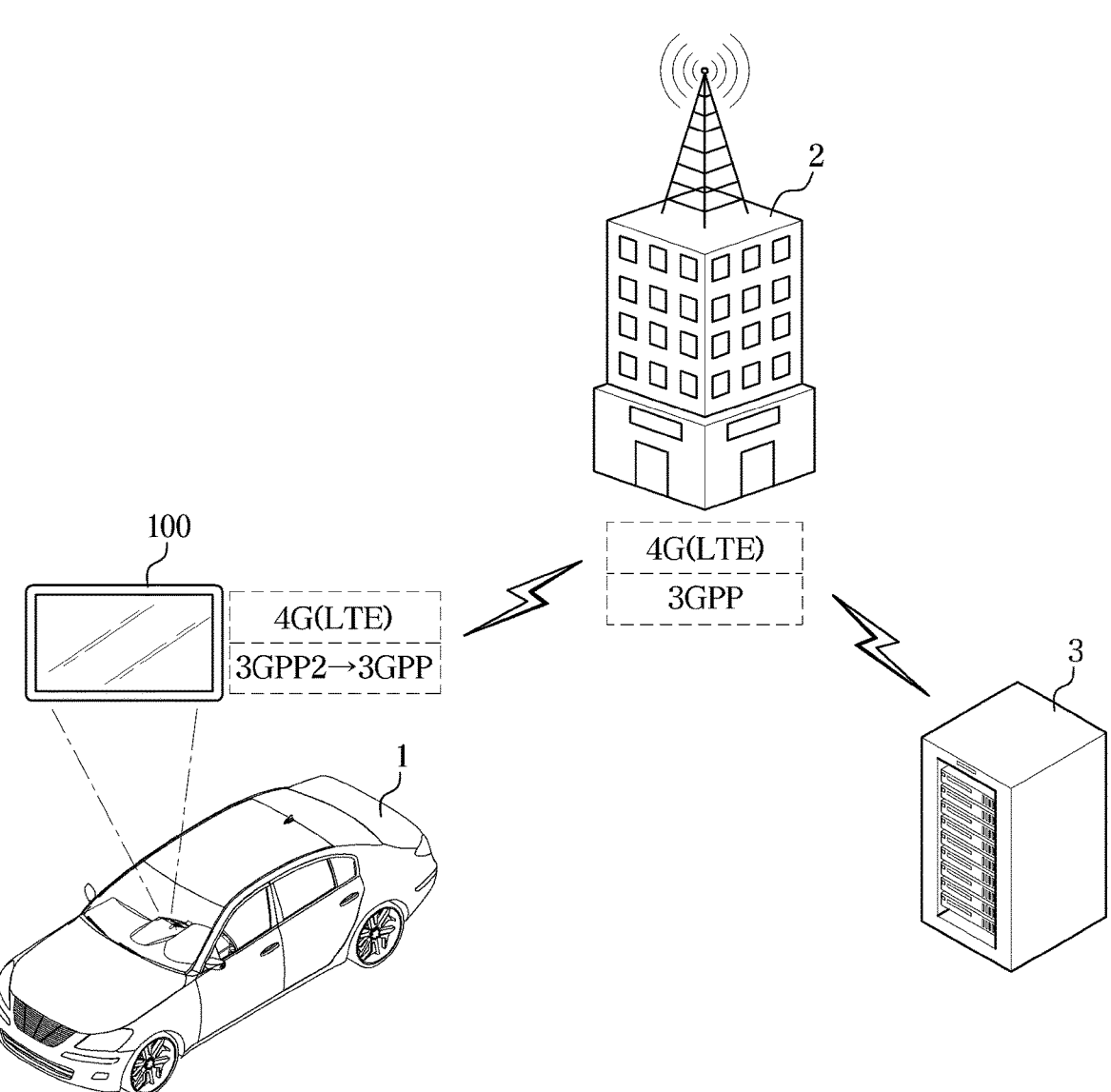
FIG. 3 illustrates a situation in which the base station supports only the second communication standard for Internet communication and SMS communication.

FIG. 1 illustrates a situation in which a base station supports both a first communication standard and a second communication standard, FIG. 2 illustrates a situation in which the base station supports only the second communication standard for Internet communication, but temporarily supports the first communication standard for SMS communication, and FIG. 3 illustrates a situation in which the base station supports only the second communication standard for Internet communication and SMS communication:

Referring FIGS. 1 to 3, a vehicle 1 according to an embodiment may include a telematics terminal 100.

The telematics terminal 100 may refer to a terminal dedicated to telematics and may be implemented in an integrated form in an AVN device of the vehicle 1.

The telematics terminal 100 may communicate with a server 3 through a base station 2 of a mobile communication company.

The base station 2 of the mobile communication company may use various radio access systems such as code division multiple access (CDMA), frequency division multiple access (FDMA), time division multiple access (TDMA), orthogonal frequency division multiple access (OFDMA), and single carrier frequency division multiple access (SCFDMA). The CDMA may be implemented with a radio technology such as universal terrestrial radio access (UTRA) and CDMA2000. The TDMA may be implemented with a radio technology such as a global system for mobile communications (GSM)/a general packet radio service (GPRS)/enhanced data rates for GSM evolution (EDGE). The OFDMA may be implemented with a radio technology such as IEEE 802.11 (Wi-Fi), IEEE 802.16 (WiMAX), IEEE 802-20, and evolved UTRA (E-UTRA). The UTRA is a part of the universal mobile telecommunications system (UMTS).

3G communication of the 3rd Generation Partnership Project 2 (3GPP2) standard corresponds to CDMA2000 and uses a 1.5 MHz band carrier.

3G communication of the 3rd Generation Partnership Project (3GPP) standard corresponds to W-CDMA or UMTS and uses a 5 MHz bandwidth carrier.

Long term evolution (LTE) of the 3rd Generation Partnership Project (3GPP) standard is a part of evolved UMTS (E-UMTS) using E-UTRA, and employs OFDMA in a downlink and SC-FDMA in an uplink. LTE-A (advanced) is an evolved version of 3GPP LTE, and is called 4G communication to distinguish it from the 3G communication described above.

4G communication of the 3rd Generation Partnership Project (3GPP) standard may use a 700 MHz to 2.6 GHz bandwidth carrier.

The base station 2 of the mobile communication company may provide a plurality of wireless communication networks to which a plurality of communication standards is applied.

For example, the base station 2 may provide a communication network to which a first communication standard (e.g., 3G communication of 3GPP2) is applied, and may provide a communication network to which a second communication standard (e.g., 4G communication of 3GPP) is applied.

Depending on a policy of the mobile communication company, the base station 2 may adopt only a more advanced communication standard of the first communication standard and the second communication standard, for example, a communication standard having a faster data transmission rate, and may not adopt the other communication standard.

Accordingly, the base station 2 may stop providing the communication network to which the first communication standard (e.g., 3G communication of 3GPP2) is applied, and provide only the communication network to which the second communication standard (e.g., 4G communication of 3GPP) is applied.

Hereinafter, for convenience of explanation, the first communication standard is defined as the 3G communication standard of 3GPP2, and the second communication standard is defined as the 4G communication standard of 3GPP, but the definitions of the first communication standard and the second communication standard are not limited thereto.

The second communication standard, for example, may be defined as any communication standard that is different from the first communication standard and has a faster data transmission rate than the first communication standard.

The server 3 may refer to the telematics server 3 that provides a telematics service to the vehicle 1.

The server 3 may provide a driver with an accident or theft detection of the vehicle 1, driving route guidance, traffic and living information, remote vehicle diagnostic services, financial services, games, etc., in real time through communication with the telematics terminal 100 of the vehicle 1.

The telematics terminal 100 may communicate with the server 3 through Internet communication and SMS communication.

For example, the telematics terminal 100 may perform Internet communication with the server 3 using a communication network to which the first communication standard of the base station 2 is applied and/or a communication network to which the second communication standard of the base station 2 is applied.

Also, the telematics terminal 100 may perform SMS communication with the server 3 using the communication network to which the first communication standard (e.g., 3G communication of 3GPP2) of the base station 2 is applied and/or the communication network to which the second communication standard (e.g., 4G communication of 3GPP) of the base station 2 is applied.

Referring FIG. 1, the telematics terminal 100 before software is updated may support Internet communication according to the first communication standard and/or Internet communication according to the second communication standard, but may only support SMS communication according to the first communication standard.

That is, the telematics terminal 100 before the software is updated does not support SMS communication according to the second communication standard.

The base station 2 may support Internet communication according to the first communication standard and Internet communication according to the second communication standard, and may support SMS communication according to the first communication standard and SMS communication according to the second communication standard.

Accordingly, the telematics terminal 100 before the software is updated may transmit and receive data to and from the server 3 by performing Internet communication according to the first communication standard and/or Internet communication according to the second communication standard, and may transmit and receive messages to and from the server 3 by performing SMS communication according to the first communication standard.

Referring FIG. 2, the telematics terminal 100 before the software is updated may still support Internet communication according to the first communication standard and/or Internet communication according to the second communication standard, but may only support SMS communication according to the first communication standard.

On the other hand, depending on the policy of the mobile communication company, the communication network to which the first communication standard is applied may be demolished, and accordingly, the base station 2 may only support Internet communication according to the second communication standard.

Meanwhile, the mobile communication company may not temporarily demolish the communication network for SMS communication according to the first communication standard so that devices to which the first communication standard is applied may cope with the removal of the communication network.

That is, the base station 2 may support both SMS communication according to the first communication standard and SMS communication according to the second communication standard.

Accordingly, the telematics terminal 100 before the software is updated may transmit and receive data to and from the server 3 by performing Internet communication according to the second communication standard, and may transmit and receive messages to and from the server 3 by performing SMS communication according to the first communication standard.

Referring to FIG. 3, the telematics terminal 100 after the software is updated may support only Internet communication according to the second communication standard and SMS communication according to the second communication standard.

The base station 2 may support only SMS communication according to the second communication standard, and may not support SMS communication according to the first communication standard.

Accordingly, the telematics terminal 100 after the software is updated may transmit and receive data to and from the server 3 by performing Internet communication according to the second communication standard, and may transmit and receive messages to and from the server 3 by performing SMS communication according to the second communication standard.

When the software of the telematics terminal 100 is not updated in the situation illustrated in FIG. 3, the telematics terminal 100 may only perform SMS communication according to the first communication standard, and as long as the base station 2 does not support SMS communication according to the first communication standard, the telematics terminal 100 may not transmit and receive messages to and from the server 3 through SMS communication.

Hereinafter, a method for enabling the telematics terminal 100 according to an embodiment to perform SMS communication according to the second communication standard through software update will be described.

Figure 4:
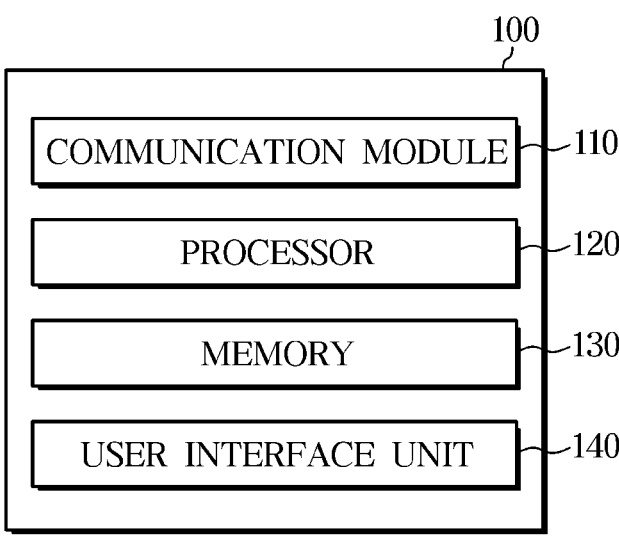
FIG. 4 is a block diagram illustrating a configuration of a telematics terminal according to an embodiment.

FIG. 4 is a block diagram illustrating a configuration of the telematics terminal according to an embodiment.

Referring to FIG. 4, the telematics terminal 100 may include a communication module no provided to communicate with the server 3, a memory 130, such as a non-transitory memory, in which software for controlling the communication module no is stored, a processor 120 and/or a user interface unit 140 provided to control the communication module 110 based on the software stored in the memory 130.

The telematics terminal 100 is configured to include the communication module no (e.g., a communication modem) to communicate with the server 3. The communication module 110 may provide a 4G communication function such as LTE as well as a 2G or 3G communication function. That is, the telematics terminal 100 may communicate with the server 3 connected to a mobile communication network through the communication module no.

The telematics terminal 100 may transmit various data to the server 3 and receive various data from the server 3.

The communication module no provided in the telematics terminal 100 may include a module necessary for mobile communication. For example, the communication module no may include a module to which 3G communication of the 3rd Generation Partnership Project 2 (3GPP2) standard is applied and/or a module to which 3G communication of the 3rd Generation Partnership Project (3GPP) standard is applied and/or a module to which 4G communication of the 3rd Generation Partnership Project (3GPP) standard is applied, but is not limited thereto.

That is, the communication module 110 may not only provide 3G and 4G networks according to current standard communication standards, but also provide functions required for networks beyond those currently being discussed in international standards organizations—for example, including a 5G network.

The communication module 110 may be connected to an integrated antenna mounted on the vehicle 1, and may transmit and receive wireless signals to and from a mobile communication network through the integrated antenna. Data processed by the communication module 110 may be transmitted to the processor 120 or may be transmitted to the mobile communication network connected through the integrated antenna.

The communication module 110 may also include an interface capable of communicating with a user terminal. In this case, the communication module 110 may communicate with the user terminal through Wi-Fi, Bluetooth, etc., but is not limited thereto.

According to various embodiments, the communication module 110 may perform SMS communication based on an SMS number of the server 3 stored in the memory 130.

The at least one memory 130 may store various data necessary for an operation of the telematics terminal 100. The memory 130 may store an operating system necessary for driving the telematics terminal 100 or various applications required to provide information.

The memory 130 may also store a control program for controlling the telematics terminal 100 (e.g., software for controlling the communication module 110) and control data for controlling the operation of the telematics terminal 100. In addition, the memory 130 may store operation data generated while performing a predetermined operation of the telematics terminal 100.

The memory 130 may include at least one storage medium of a flash memory, a hard disk, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The at least one processor 120 may control the overall operation of the telematics terminal 100 based on the control program and control data stored in the memory 130.

The processor 120 may control operations of various modules and devices built in the telematics terminal 100.

For example, the processor 120 may control the communication module no based on software stored in the memory 130.

In an embodiment, the processor 120 may generate a control signal for controlling various modules, devices, etc. built in the telematics terminal 100 to control the operation of each of the above-described components. Also, the processor 120 may output music or an image according to a control command of the user terminal paired with the telematics terminal 100, and may control the module installed in the vehicle 1 by using the information of the user terminal when the user terminal is manipulated.

The user interface unit 140 may include a display part for outputting various data and an input part for receiving various user inputs.

For example, the user interface unit 140 may provide a user interface for updating the software of the telematics terminal 100.

In an embodiment, the processor 120 may control the user interface unit 140 to provide the user interface for updating the software based on the reception of an update request signal from the server 3.

The processor 120 may control the communication module 110 to transmit a signal for requesting update data to the server 3 based on receiving a user input for approving an update of the software through the user interface unit 140.

Also, the processor 120 may update the software stored in the memory 130 based on the reception of the update data from the server 3. Accordingly, the software stored in the memory 130 may be maintained as the latest version.

That is, the telematics terminal 100 according to an embodiment may update the software through an over the air (OTA) method.

According to various embodiments, the user may update the software of the telematics terminal 100 by inserting a USB in which the software is stored through a USB port provided in the vehicle 1.

Figure 5:
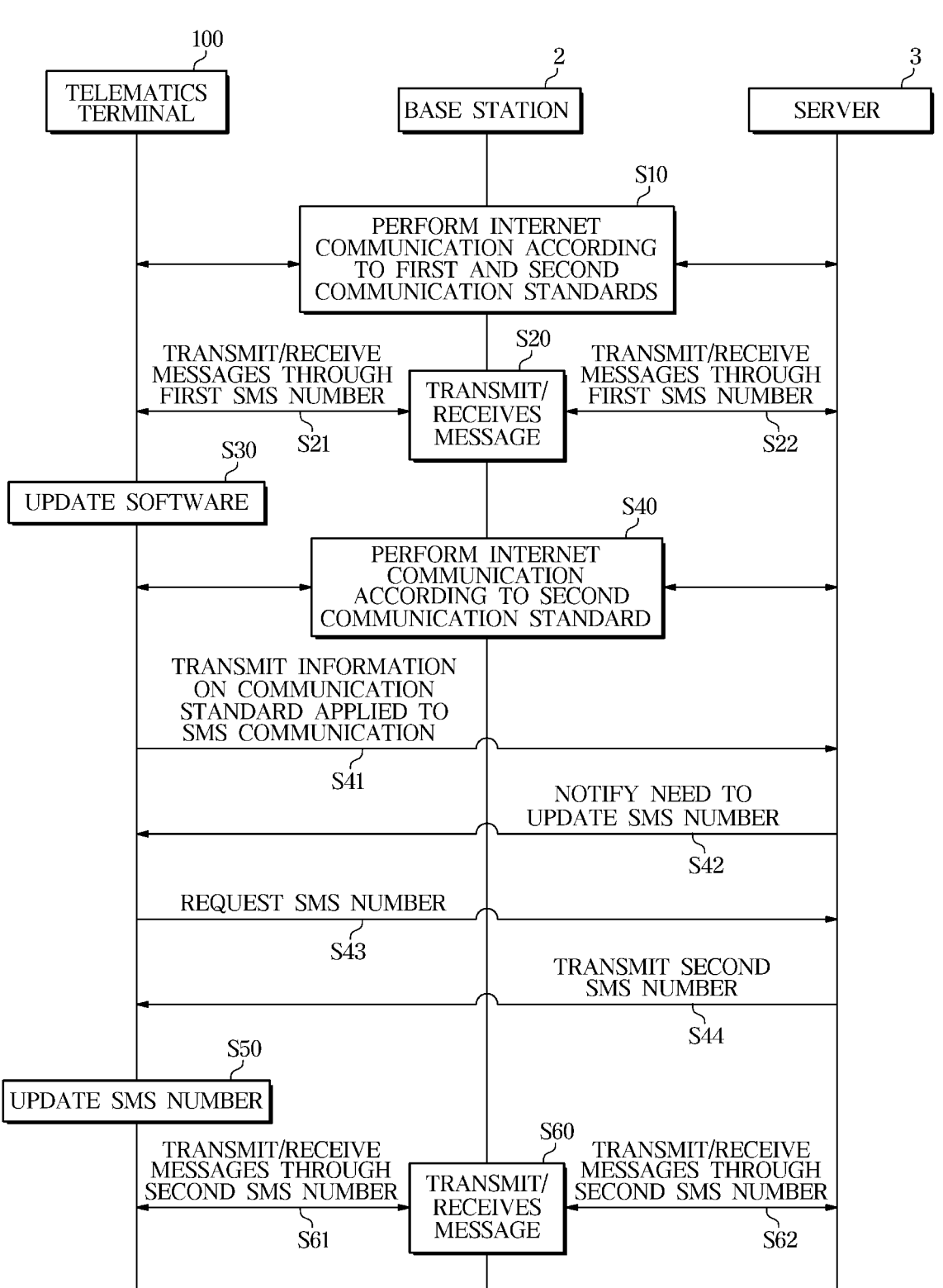
FIG. 5 is a flowchart illustrating a process for changing a communication setting of the telematics terminal.

FIG. 5 is a flowchart illustrating a process for changing a communication setting of the telematics terminal.

Referring to FIG. 5, in a situation where the base station 2 supports both the first communication standard and the second communication standard, the telematics terminal 100 may transmit and receive data to and from the server 3 by performing Internet communication according to the first communication standard and/or Internet communication according to the second communication standard, through the base station 2 (S10).

In this case, the memory 130 may store a first software supporting the first communication standard. The memory 130 may also store a first SMS number corresponding to the first communication standard.

The first SMS number may include a transmission number for transmitting an SMS message to the server 3 and/or a reception number for receiving an SMS message from the server 3 through the base station 2 supporting the first communication standard.

When the first communication standard corresponds to the 3GPP2 standard, the first SMS number corresponding to the first communication standard may not include a country code.

Accordingly, the first SMS number may include a 10-digit number.

The first SMS number may be set by an operator when the telematics terminal 100 is manufactured, or may be set by the operator after the telematics terminal 100 is manufactured.

That is, the first SMS number may be preset as a number capable of transmitting an SMS message to the server 3 providing the telematics service according to the first communication standard or receiving the SMS message from the server 3 providing the telematics service according to the first communication standard.

The telematics terminal 100 may perform SMS communication based on the first SMS number stored in the memory 130.

When the first software is stored in the memory 130, the processor 120 may control the communication module no to perform SMS communication with the server 3 based on the first SMS number corresponding to the first communication standard.

As an example, the telematics terminal 100 may transmit an SMS message to the server 3 through the base station 2 using the first SMS number (S21), and the server 3 may receive the SMS message transmitted from the telematics terminal 100 through the base station 2 (S22).

In addition, the server 3 may transmit an SMS message to the telematics terminal 100 through the base station 2 using the first SMS number (S22), and the telematics terminal 100 may receive the SMS message transmitted from the server 3 through the base station 2 (S21).

The base station 2 may transmit an SMS message to the server 3 which is a destination corresponding to the first SMS number based on the reception of the SMS message including the first SMS number from the terminal 100, and may transmit an SMS message to the telematics terminal 100 which is a destination corresponding to the first SMS number based on the reception of the SMS message including the first SMS number from the server 3 (S20).

The SMS message may include text data and/or image data.

As such, the telematics terminal 100 may transmit and receive data with the server 3 using SMS communication in addition to Internet communication depending on the type of data.

When the communication network according to the first communication standard is scheduled to be demolished depending on the policy of the mobile communication company or when the Internet communication network according to the first communication standard has been demolished, but it is a transitional period to support the first communication standard for SMS communication, the telematics terminal 100 may need to update the software in order to correspond to a change in the communication network of the base station 2.

In an embodiment, the telematics terminal 100 may receive update data from the server 3 through Internet communication based on at least one of the first communication standard and the second communication standard. That is, the telematics terminal 100 may update the software in the OTA method.

In this case, the communication module no may receive the update data for updating the first software to the second software from the server 3 through Internet communication based on the first communication standard or the second communication standard.

In another embodiment, the telematics terminal 100 may receive the update data through the USB port of the vehicle 1.

In this case, the update data refers to update data for changing the communication standard applied to the SMS communication of the telematics terminal 100 from the first communication standard to the second communication standard.

In an embodiment, when the first software is stored in the memory 130, the telematics terminal 100 may support the first communication standard, and when the second software is stored in the memory 130, the telematics terminal 100 may support the second communication standard.

When the communication network according to the first communication standard of the base station 2 is scheduled to be demolished depending on the policy of the mobile communication company, the operator of the server 3 providing the telematics service may distribute the update data for updating the first software to the second software to the user of the telematics terminal 100.

The first software may correspond to software for controlling the communication module 110 to communicate with the server 3 using a frequency band (e.g., 1.5 MHz) corresponding to the first communication standard, and the second software may correspond to software for controlling the communication module 110 to communicate with the server 3 using a frequency band corresponding to the second communication standard.

The telematics terminal 100 may update the software based on the update data for changing the communication standard applied to the SMS communication (S30). Accordingly, the first software stored in the memory 130 may be updated with the second software.

The telematics terminal 100 with the updated software may transmit and receive data to and from the server 3 by performing Internet communication according to the second communication standard through the base station 2 (S40).

That is, the telematics terminal 100 with the updated software may only perform communication according to the second communication standard by supporting only the second communication standard.

In order for the telematics terminal 100 to perform SMS communication with the server 3, information on a second SMS number corresponding to the second communication standard is required.

The second SMS number may include a transmission number for transmitting an SMS message to the server 3 and/or a reception number for receiving an SMS message from the server 3 through the base station 2 supporting the second communication standard.

When the second communication standard corresponds to the 3GPP standard, the second SMS number corresponding to the second communication standard may not include a country code.

Accordingly, the second SMS number may include an 11-digit number.

Because only the first SMS number is stored in the memory 130 of the telematics terminal 100, it is impossible for the telematics terminal 100 to transmit and receive messages to and from the server 3 using the first SMS number through the base station 2 supporting the second communication standard.

FIG. 6 illustrates an example of communication standard information transmitted from the telematics terminal to the server.

Referring to FIG. 6, the telematics terminal 100 may transmit information on the communication standard applied to the SMS communication to the server 3 based on the satisfaction of a preset condition (S41).

That is, when the second software updated from the first software is stored in the memory 130, the processor 120 may control the communication module 110 to transmit information on the communication standard applied to the SMS communication to the server 3 based on the satisfaction of the preset condition.

The information on the communication standard applied to the SMS communication is information on the communication standard supported by the second software stored in the memory 130 of the telematics terminal 100, and may include data for discriminating whether the communication standard supported by the second software corresponds to the 3GPP2 standard or the 3GPP standard.

For example, when a discrimination value corresponds to zero, the communication standard applied to the SMS communication may be defined as corresponding to the 3GPP2 standard, and when the discrimination value corresponds to one, the communication standard applied to the SMS communication may be defined as corresponding to the 3GPP standard.

According to various embodiments, when the discrimination value is not transmitted to the server 3, the communication standard applied to the SMS communication may be defined as corresponding to the 3GPP2 standard, but is not limited thereto.

The preset condition may include various conditions such as turning-on of ignition of the vehicle 1, and/or sending a message to the server 3 through the first SMS number but not receiving the message from the server 3, and/or not receiving any message from the server 3 through the first SMS number for a preset period.

As an example, the telematics terminal 100 may transmit information on the communication standard applied to the SMS communication of the telematics terminal 100 to the server 3 based on the ignition of the vehicle 1 being turned on.

In this case, the telematics terminal 100 may transmit the information on the communication standard applied to the SMS communication of the telematics terminal 100 to the server 3 through Internet communication according to the second communication standard.

In an embodiment, the processor 120 may control the communication module no to transmit the information on the communication standard applied to the SMS communication of the telematics terminal 100 to the server 3 based on the ignition of the vehicle 1 being turned on.

The server 3 may determine whether the SMS number (first SMS number) stored in the memory 130 of the telematics terminal 100 needs to be updated based on the reception of the information on the communication standard applied to the SMS communication of the telematics terminal 100 from the telematics terminal 100, and may transmit the second SMS number corresponding to the second communication standard to the telematics terminal 100 when the SMS number stored in the memory 130 of the telematics terminal 100 needs to be updated (S44).

That is, the processor 120 may control the communication module no to receive the second SMS number corresponding to the second communication standard from the server 3.

According to various embodiments, several steps may be further added to a process in which the server 3 transmits the second SMS number to the telematics terminal 100.

For example, the server 3 may transmit a signal (hereinafter, 'first signal') for notifying the need to update the SMS number to the telematics terminal 100 based on that the communication standard applied to the SMS communication of the telematics terminal 100 corresponds to the second communication standard (discrimination value 1 in FIG. 6) (S42).

Figure 7:
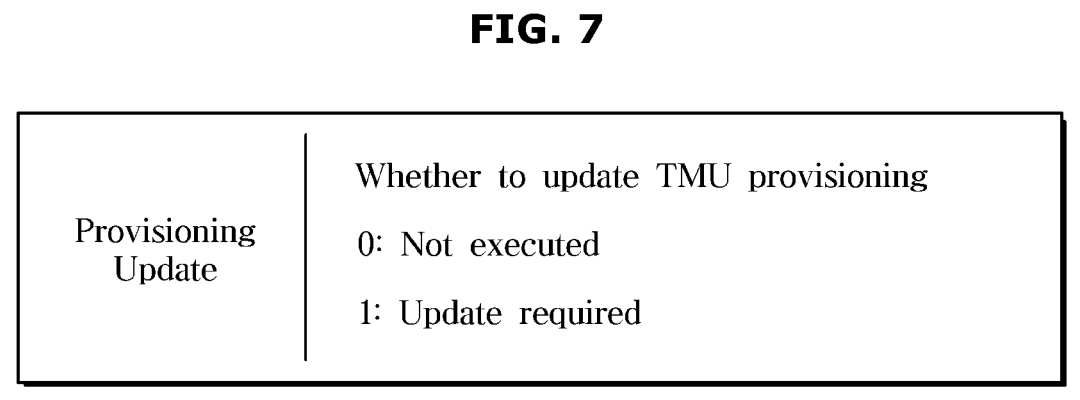

FIG. 7 illustrates an example of an update request message transmitted from the server to the telematics terminal.

Referring to FIG. 7, the update request message may include data for discriminating whether the SMS number needs to be updated or not.

For example, when the discrimination value corresponds to zero, it may be defined that the update of the SMS number of the server 3 stored in the memory 130 is not needed, and when the discrimination value corresponds to one, it may be defined that the update of the SMS number of the server 3 stored in the memory 130 is needed.

In this case, the first signal may be defined as a signal including data having the discrimination value of one.

The telematics terminal 100 may transmit a signal (hereinafter, 'second signal') for requesting the second SMS number to the server 3 based on the reception of the first signal from the server 3 (S43).

That is, the processor 120 may control the communication module no to transmit the second signal for requesting the second SMS number to the server 3 based on the reception of the first signal transmitted by the server 3 in response to the communication standard applied to the SMS communication of the telematics terminal 100 corresponding to the second communication standard.

Finally, the server 3 may transmit the second SMS number to the telematics terminal 100 based on the reception of the second signal from the telematics terminal 100 (S44).

FIG. 8 illustrates an example of the form of SMS numbers according to various communication standards.

Referring to FIG. 8, when the first communication standard corresponds to the 3GPP2 standard, it may be confirmed that the first SMS number corresponding to the first communication standard consists of a 10-digit number not including the country code.

In addition, when the second communication standard corresponds to the 3GPP standard, it may be confirmed that the second SMS number corresponding to the second communication standard consists of an 11-digit number including the country code.

As such, the telematics terminal 100 may acquire the SMS number of the server 3 corresponding to the communication standard by transmitting information on the communication standard supported by the software stored in the memory 130 to the server 3.

The above-described processes (S41, S42, S43, and S44) may be performed through Internet communication according to the second communication standard.

That is, the communication module no may perform the above-described processes (S41, S42, S43, and S44) through Internet communication according to the second communication standard.

The telematics terminal 100 may update the first SMS number stored in the memory 130 to the second SMS number based on the reception of the second SMS number (S50), and thereafter may perform the SMS communication with the server 3 through the second SMS number (S60).

According to various embodiments, the telematics terminal 100 may update the first SMS number to the second SMS number only when a specific condition is satisfied.

For example, the telematics terminal 100 may transmit a signal (hereinafter, 'third signal') for notifying that the update has been completed to the server 3 through the second SMS number. The server 3 may transmit a signal (hereinafter, 'fourth signal') for notifying that the third signal has been received to the telematics terminal 100 through the second SMS number based on the reception of the third signal, and the telematics terminal 100 may update the first SMS number to the second SMS number based on the reception of the fourth signal.

As another example, the telematics terminal 100 may notify the server 3 that the update has been completed through Internet communication according to the second communication standard, and may update the first SMS number to the second SMS number based on reception of a response message (e.g., acknowledgement message) from the server 3.

After the first SMS number stored in the memory 130 is updated to the second SMS number, the telematics terminal 100 may transmit and receive SMS messages to and from the server 3 using the second SMS number through the base station 2 (S61), and the server 3 may also transmit and receive the SMS messages to and from the telematics terminal 100 using the second SMS number through the base station 2 (S62).

According to the disclosure, by updating an SMS number stored in a telematics terminal only when the SMS number received from a server is valid, an incorrect setting of the SMS number may be prevented in advance.

According to the disclosure, it is possible to flexibly deal with the removal of a communication network of a base station only by updating software of the telematics terminal.

As is apparent from the above, according to the disclosure, the convenience of users of an existing telematics terminal can be improved by enabling communication with a server in a new communication network environment through a change in software of a telematics terminal.

In addition, even when a mobile communication company demolishes a base station to which an existing communication standard is applied and builds a base station to which a new communication standard is applied, there is no need to compensate users of the telematics terminal for inability to connect to a communication network.

Examples of a telematics terminal and a method for changing a communication setting of the telematics terminal are not limited to the above, and the embodiments described above are exemplary in all respects. Therefore, those of ordinary skill in the art to which the disclosure pertains will be able to understand that the disclosure may be embodied in other specific forms without changing the technical spirit or essential characteristics thereof. The scope of the disclosure represents in the claims rather than the foregoing description, and all differences within the scope equivalent thereto should be construed as being included in the disclosure.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

What is claimed is:

1. A method of changing a communication setting of a telematics terminal provided in a vehicle, the method comprising:

performing, by the telematics terminal, short message service (SMS) communication with a server based on a first SMS number corresponding to a first communication standard;

transmitting, by the server, update data for changing the first communication standard applied to the SMS communication;

updating, by the telematics terminal, software based on receiving the update data;

transmitting, by the telematics terminal, information on the first communication standard applied to the SMS communication to the server;

transmitting, by the server, a second SMS number corresponding to a second communication standard to the telematics terminal based on the information on the first communication standard applied to the SMS communication; and updating, by the telematics terminal, the first SMS number to the second SMS number based on reception of the second SMS number from the server and performing the SMS communication with the server based on the second SMS number.

2. The method according to claim 1, wherein transmitting the second SMS number to the telematics terminal comprises:

transmitting, by the server, a first signal for notifying that a SMS number needs to be updated to the telematics terminal based on a communication standard applied to the SMS communication corresponding to the second communication standard;

transmitting, by the telematics terminal, a second signal for requesting the second SMS number to the server based on reception of the first signal; and transmitting, by the server, the second SMS number to the telematics terminal based on reception of the second signal.

3. The method according to claim 2, wherein updating the first SMS number to the second SMS number comprises:

transmitting, by the telematics terminal, a third signal for notifying that the update has been completed to the server through the second SMS number;

transmitting, by the server, a fourth signal for notifying that the third signal has been received to the telematics terminal through the second SMS number based on reception of the third signal; and updating, by the telematics terminal, the first SMS number to the second SMS number based on reception of the fourth signal.

4. The method according to claim 1, wherein transmitting, by the telematics terminal, the information on the first communication standard applied to the SMS communication to the server is performed in response to an ignition of the vehicle being turned on.

5. The method according to claim 1, further comprising:

performing, by the telematics terminal, the SMS communication with the server based on the second SMS number after the first SMS number is updated to the second SMS number.

6. The method according to claim 1, wherein:

the first communication standard is a 3rd Generation Partnership Project 2 (3GPP2) standard, and the second communication standard is a 3rd Generation Partnership Project (3GPP) standard.

7. The method according to claim 1, wherein:

the first SMS number does not include a country code, and the second SMS number includes the country code.

8. The method according to claim 7, wherein:

the first SMS number comprises a 10-digit number, and the second SMS number comprises an 11-digit number.

9. The method according to claim 1, wherein updating, by the telematics terminal, the software based on the update data is performed through Internet communication based on at least one of the first communication standard and the second communication standard.

10. The method according to claim 1, wherein transmitting, by the telematics terminal, the information on the first communication standard applied to the SMS communication to the server; and transmitting, by the server, the second SMS number to the telematics terminal are performed through Internet communication based on the second communication standard.

11. A telematics terminal provided in a vehicle, the telematics terminal comprising:

a communication module configured to communicate with a server;

a memory in which software for controlling the communication module is stored, the memory being a non-transitory memory; and a processor configured to control the communication module based on the software stored in the memory, wherein:

when a first software is stored in the memory, the processor is configured to control the communication module to perform SMS communication with the server based on a first SMS number corresponding to a first communication standard, and when a second software to which the first software is updated is stored in the memory, the processor is configured to:

control the communication module to transmit information on the first communication standard applied to the SMS communication to the server and receive a second SMS number corresponding to a second communication standard from the server;

update the first SMS number to the second SMS number based on reception of the second SMS number from the server; and control the communication module to perform the SMS communication with the server based on the second SMS number.

12. The telematics terminal according to claim 11, wherein the processor is further configured to:

control the communication module to transmit a second signal for requesting the second SMS number to the server based on reception of a first signal transmitted by the server in response to a communication standard applied to the SMS communication corresponding to the second communication standard.

13. The telematics terminal according to claim 12, wherein the processor is further configured to:

control the communication module to transmit a third signal for notifying that the update has been completed to the server through the second SMS number; and update the first SMS number to the second SMS number based on reception of a fourth signal transmitted by the server through the second SMS number in response to reception of the third signal.

14. The telematics terminal according to claim 11, wherein the processor is further configured to:

control the communication module to transmit the information on the first communication standard applied to the SMS communication to the server in response to an ignition of the vehicle being turned on.

15. The telematics terminal according to claim 11, wherein the processor is further configured to:

control the communication module to perform the SMS communication with the server based on the second SMS number after the first SMS number is updated to the second SMS number.

16. The telematics terminal according to claim 15, wherein:

the first communication standard is a 3rd Generation Partnership Project 2 (3GPP2) standard, and the second communication standard is a 3rd Generation Partnership Project (3GPP) standard.

17. The telematics terminal according to claim 11, wherein:

the first SMS number does not include a country code, and the second SMS number includes the country code.

18. The telematics terminal according to claim 17, wherein:

the first SMS number comprises a 10-digit number, and the second SMS number comprises an 11-digit number.

19. The telematics terminal according to claim 11, wherein the communication module is configured to:

receive update data for updating the first software to the second software through Internet communication based on the first communication standard or the second communication standard.

20. The telematics terminal according to claim 11, wherein the communication module is configured to:

transmit the information on the first communication standard applied to the SMS communication to the server through Internet communication based on the second communication standard; and receive the second SMS number corresponding to the second communication standard from the server.

*    *    *    *    *